Figure 14:
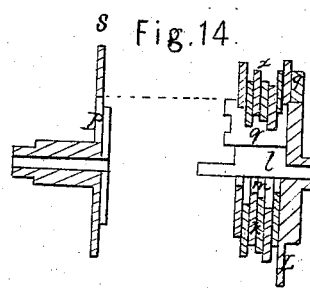

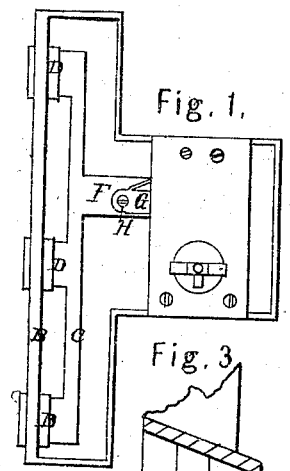
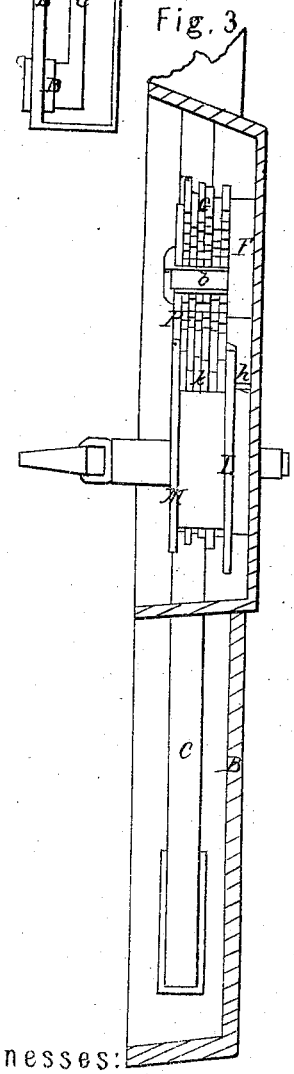
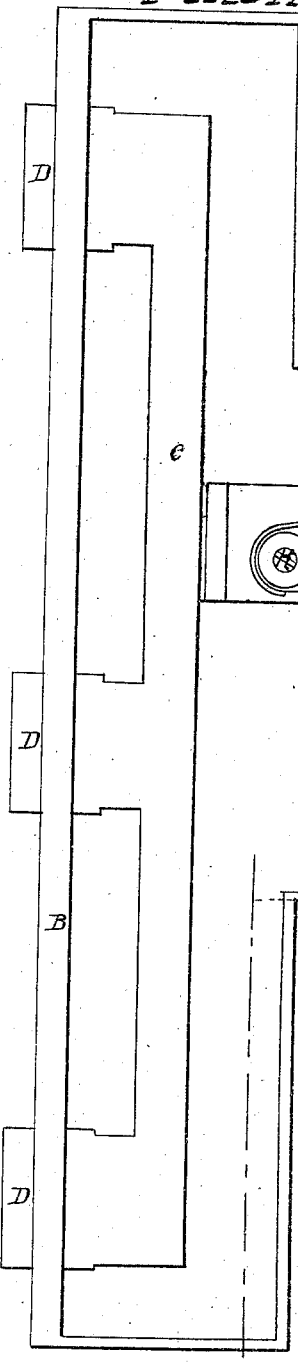
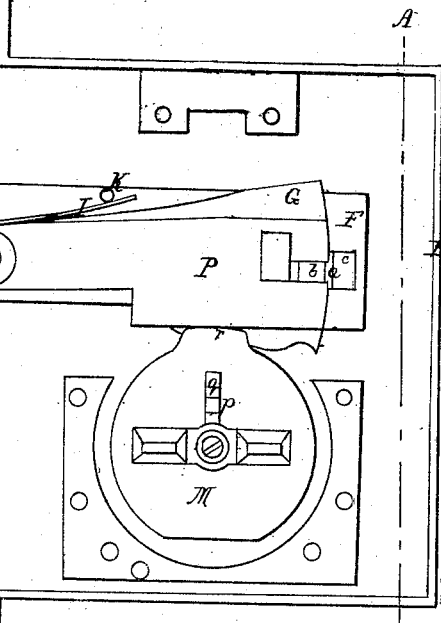

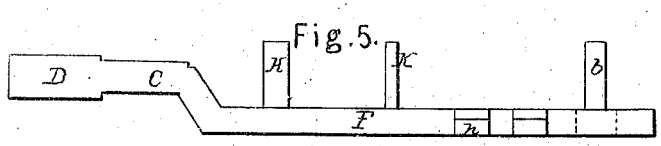
Sheet 2. 3 Sheets.
W. Hall
Door Lock
Nº 11,158     Patented Jun. 27, 1854.
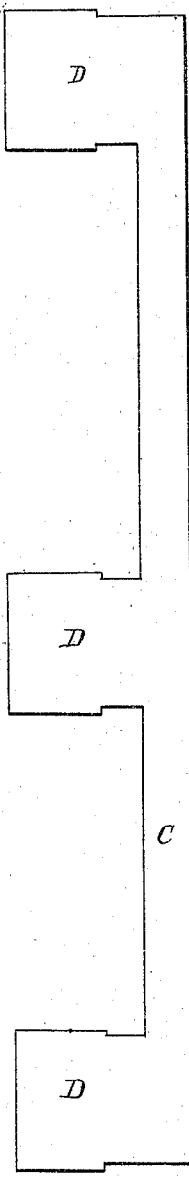
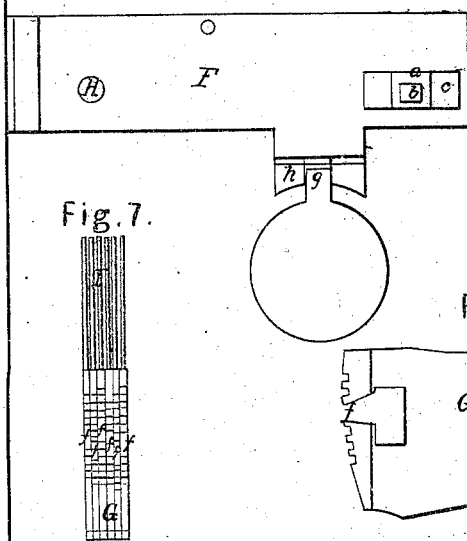
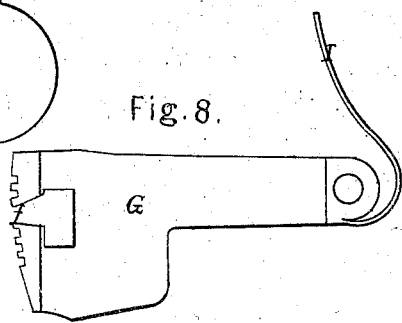
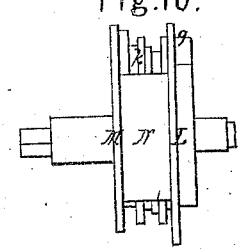
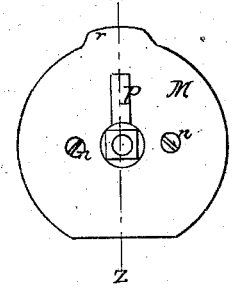
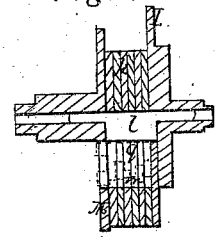
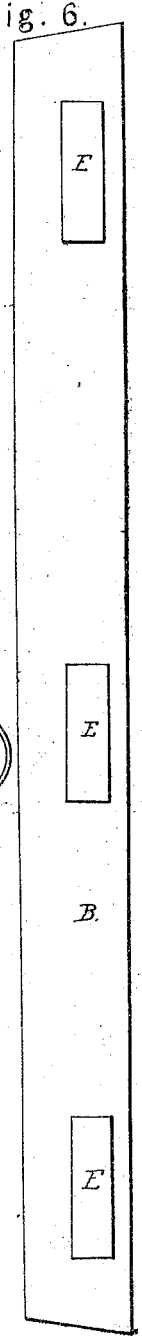
Witnesses:
Saml Cooper
John S. blow
Inventor:
Wm Hall Sheet 3. 3 Sheets W. Hall.
Door Lock.

Nº 11.158.　　　　　　Patented Jun. 27. 1854

Witnesses:
Saml Cooper
John L. Blow

Inventor:
Wm Hall

UNITED STATES PATENT OFFICE.

WILLIAM HALL, OF BOSTON, MASSACHUSETTS.

BANK-LOCK.

Specification of Letters Patent No. 11,158, dated June 27, 1854.

*To all whom it may concern:*

Be it known that I, WILLIAM HALL, of Boston, in the county of Suffolk and State of Massachusetts, have invented certain new and useful Improvements in Locks, of which the following is a full, clear, and exact description, reference being had to the annexed drawings, making part of this specification, in which—

Figure 1 is a plan of the lock. Fig. 2 is the same upon an enlarged scale, the confining plates being removed to show the parts within. Fig. 3 is a section upon the line A, A, of Fig. 2; Fig. 4, a plan of the bolt; Fig. 5, an end view of the same; Fig. 6, an end view of the lock; Fig. 7, an end view of the tumblers; Fig. 8, a plan of one of the same; Figs. 9, 10, 11, 12, 13, 14, 15, 16, 17, 18 and 19 details which will be referred to hereafter.

My invention has particular reference to the construction of the key itself or that part of the mechanism which is employed to arrange the tumblers and shoot the bolt. The lock to which it is represented as applied in the drawing is a double acting tumbler lock of ordinary construction. I will therefore only refer generally to its principal parts and pass on to the description of that portion of mechanism which forms the subject of my present invention.

B is the case of the lock; C the bolt, the heads D of which pass through the openings E in the end of the lock case. The shank F of the bolt lies against the back of the lock and is guided by the square part $a$ of the stump $b$, which is attached to the back of the lock and projects up through the slot $c$ of the shank. The tumblers, seen at G in Figs. 1, 2, 3, and 7 and detached in Fig. 8, are attached to the shank of the bolt and slide with it, they being all pivoted to the pin H, rising from its upper surface. The springs I attached to the tumblers serve to keep them constantly depressed when they are not raised by the bits of the key. These springs pass beneath the pin K also attached to the shank of the bolt. It is evident that as the tumblers are attached to and move with the bolt while the stump is stationary that the former must be arranged so that the latter may pass through their notches $f$, as seen in Figs. 2 and 3, before the bolt can be shot or withdrawn. This is accomplished in my lock by means of a revolving key which remains constantly within the interior of the lock, the bits of which are arranged in a proper manner to raise the tumblers as required by a "former" which is inserted into a cavity in the key at the moment of locking or unlocking.

Figure 13:
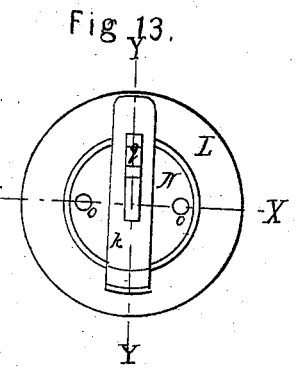
Figure 12:
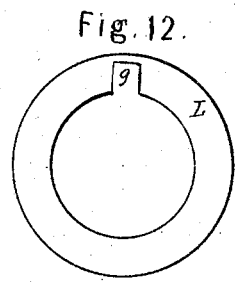
Figure 15:
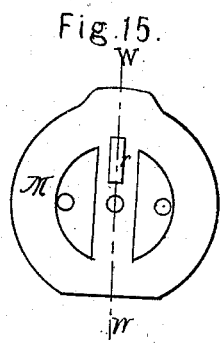
Figure 16:
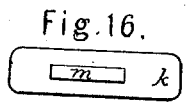
Figure 17:
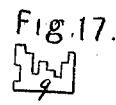
Figure 18:
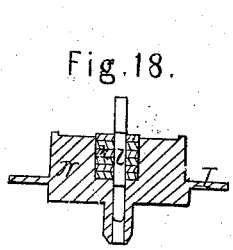
Figure 19:
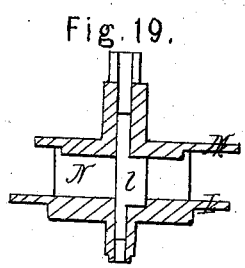

Fig. 9 is a plan of the key; Fig. 10 an elevation of the same; Fig. 11 is a section upon the line Z Z of Fig. 1; Fig. 12 is a bottom view of the lower plate of the key. Fig. 13 is a top view of the same with the parts immediately attached thereto. Fig. 14 is a section upon the line Y Y of Fig. 13. Fig. 15 is an underneath view of the top plate M, the section S being upon the line W, W. Fig. 16 is a plan of one of the sliding plates; Fig. 17, the "former" $q$; Fig. 18, a section upon the line X X of Fig. 13. Fig. 19 is a section upon Z Z of Fig. 9, the key and sliders being removed.

The key is composed of two plates L and M, to the former of which is attached the stud $g$, Figs. 4, 10, and 12, which enters a notch in the projection $h$, Figs. 3, 4, 5, upon the shank F, and shoots the bolt.

N is a barrel, seen in elevation in Fig. 10, in plan in Fig. 13, and in section in Fig. 18. This drum is attached to the bottom plate L, and is slotted through its center to receive the sliding plates or bits $k$, which will be presently described.

Fig. 18 is a transverse section through the slots and the sliding plates upon the lines X X of Fig. 13. The plates $k$, seen detached in Fig. 16, are of equal size and thickness and have each a slot $m$ in the center.

$l$ is a guide piece or pin between the plates L and M, and in the center of the slot in the barrel N upon which the sliders $k$ are placed. The plates L and M are secured together by the screws $n$, which pass through the plate M into the holes $o$, of the barrel N.

$p$ is a slot in the upper plate M immediately over the slots $m$ in the sliders $k$. These slots form a cavity into which the "former" $q$, Fig. 17, is placed, as seen in red in Fig. 11. When the key is turned for the purpose of locking or unlocking the sliders arrange themselves upon the steps of the "former" $q$, as seen in Fig. 14 and thus form the actual bits $x$, by which the tumblers are raised.

It will be perceived that the small cavity $m'$, Fig. 11, is the only portion of the interior of the lock which is at any time exposed by the key hole and that it will be impossible to injure the lock, or at least to rupture any of its parts by the explosion of gunpowder within this cavity, as it is too small to hold sufficient for that purpose.

P is an additional tumbler which is raised by the projection $r$ upon the upper plate M of the key. Like the other tumblers it is furnished with an opening through which the stump $b$ must pass when the bolt is shot.

Operation:—The operation of this portion of the mechanism is as follows: The key being turned as seen in Fig. 11 the sliders assume the position there represented and the "former" is inserted through the opening $p$ into the cavity $m'$. The key is then turned into the position seen at Figs. 2 and 14, when the sliders fall by their own weight upon the steps of the "former" $q$, and arrange themselves in the required manner to raise the tumblers, the projection $r$ at the same time raising the exterior tumbler P, the "gating" $f$, of all the tumblers being thus brought in line to permit the passage of the stump $b$, the bolt is shot by the stud $g$, upon the lower plate of the key. The latter is then again revolved into the position seen in Fig. 11, and the "former" $q$ is taken out, the key being left within the interior of the lock.

It is evident that when the key is turned so as to expose the hole which receives the "former" $q$ the tumblers cannot be interfered with by any instrument inserted at the key hole, as the rigid pin $l$, lies immediately over the key hole and between the space occupied by the former $q$ and the tumblers. When however the key is turned so as to enable the sliders to bear upon the tumblers, the key hole is no longer exposed, it being closed by the act of turning the key and there is then no possibility of inserting an instrument to operate upon the tumblers.

I do not claim inserting a key within a cavity in the lock and raising it by direct pressure produced by a wedge or other means against the tumblers or against pins projecting therefrom, as this leaves the tumblers at all times exposed to be operated upon by the instrument inserted at the key hole, but, What I do claim as my invention and desire to secure by Letters Patent is—

The slotted sliders $k$ which are allowed to arrange themselves upon the steps of the former $q$, to form the bits of the key, in combination with the pin $l$ or its equivalent, when the tumblers are operated by turning the key, whereby the tumblers are rendered inaccessible to any instrument that may be inserted at the open key hole, and the latter is closed whenever the key is turned so as to bring the sliders to bear upon the tumblers.

WM. HALL.

Witnesses:
SAM COOPER,
JOHN S. BLOW.